US 6,564,349 B1

(12) United States Patent
Mitten et al.

(10) Patent No.: US 6,564,349 B1
(45) Date of Patent: May 13, 2003

(54) BUILT-IN SELF-TEST SYSTEMS AND METHODS FOR INTEGRATED CIRCUIT BASEBAND QUADRATURE MODULATORS

(75) Inventors: John W. Mitten, Cary, NC (US); Randall G. Bright, Pittsboro, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/512,950

(22) Filed: Feb. 25, 2000

(51) Int. Cl.[7] ............................................. G01R 31/28
(52) U.S. Cl. ..................................................... 714/733
(58) Field of Search .......................... 714/733; 375/224

(56) References Cited

U.S. PATENT DOCUMENTS

| | | | |
|---|---|---|---|
| 3,622,877 A | 11/1971 | MacDavid et al. | 375/222 |
| 4,022,988 A | 5/1977 | Lentz et al. | 375/213 |
| 4,393,508 A | 7/1983 | Boudault | 375/9 |
| 5,274,668 A | 12/1993 | Marschall | 375/10 |
| 6,259,314 B1 * | 7/2001 | Liu et al. | 329/304 |

FOREIGN PATENT DOCUMENTS

EP      1 028 557 A2      8/2000

OTHER PUBLICATIONS

Desormeaux et al., A High Speed, Real–to–Quadrature Converter with Filtering and Decimation, 1996, IEEE, p. 252–255.*
Inkol et al., A GaSa Integrated Circuit for Wideband Digital Quadrature Demodulation, 1995, IEEE, p. 1011–1014.*
International Search Report, PCT/US 01/01775, Jun. 22, 2001.
Data sheet, Philips PCF50732 Baseband and Audio Interface for GSM, May 3, 1999.

* cited by examiner

*Primary Examiner*—Phung M. Chung
*Assistant Examiner*—Shelly A Chase
(74) *Attorney, Agent, or Firm*—Myers Bigel Sibley & Sajovec

(57) ABSTRACT

Integrated circuit transmit modules include an integrated circuit substrate, a baseband I/Q modulator in the integrated circuit substrate that modulates an input signal to produce in-phase (I) and quadrature (Q) baseband modulated inputs, and a built-in self-test (BIST) module in the integrated circuit substrate that monitors the I and Q baseband modulated outputs, to determine whether the baseband I/Q modulator is operating properly. The BIST module generates test input data for the baseband I/Q modulator. Alternatively or in addition, the BIST module can monitor the I and Q baseband modulated outputs in response to a communications input signal from a digital signal processor. The BIST module can generate a status signal to indicate whether the baseband I/Q modulator is operating properly. The BIST module includes a first filter that is responsive to the input signal to produce a filtered input signal and a second filter that is responsive to the I and Q baseband modulated outputs, to produce a filtered output signal. A compare module compares the filtered input signal and the filtered output signal. A phase and amplitude adjuster adjusts the phase and/or amplitude of the output of the first filter. Accordingly, modulators are tested prior to and/or during field use.

25 Claims, 5 Drawing Sheets

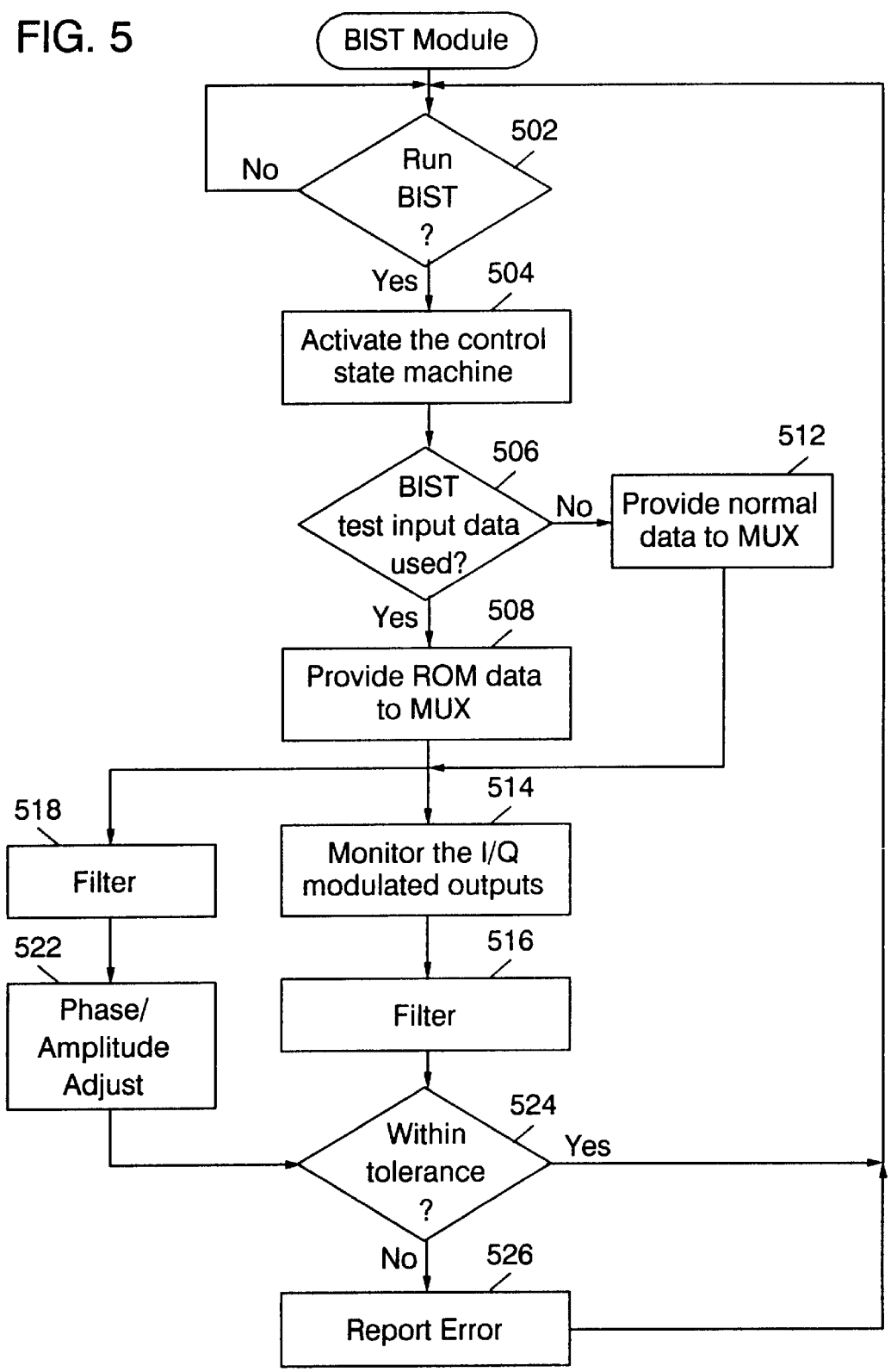

BUILT-IN SELF-TEST SYSTEMS AND METHODS FOR INTEGRATED CIRCUIT BASEBAND QUADRATURE MODULATORS

FIELD OF THE INVENTION

This invention relates to modulation systems and methods, and more particularly to integrated circuit modulators.

BACKGROUND OF THE INVENTION

Baseband quadrature modulators are widely used in radio frequency (RF) communication systems, including but not limited to wireless communications terminals such as mobile radiotelephones. As is well known to those having skill in the art, a baseband quadrature modulator modulates an input signal to produce in-phase (I) and quadrature (Q) baseband modulated outputs. The qaudrature modulator often is referred to as an I/Q modulator. The in-phase and quadrature baseband modulated outputs generally are provided to an RF modulator that modulates the I and Q modulated inputs onto a carrier frequency for transmission by an antenna.

Baseband I/Q modulators may be provided in an integrated circuit, to provide an integrated circuit transmit module. For example, an Application Specific Integrated Circuit (ASIC) may include a baseband I/Q modulator and supporting circuitry, such as an interface to a Digital Signal Processor (DSP) and/or an interface to a controller or Central Processing Unit (CPU). See for example, the data sheet for the Philips PCF50732 Baseband and Audio Interface for GSM, May 3, 1999. Other baseband modulator integrated circuits are well known to those having skill in the art, and need not be described in further detail herein.

Integrated circuit baseband modulators generally are tested by applying functional and/or manufacturing test vectors to the integrated circuit baseband I/Q modulator. Input and output samples then can be compared using an external test bench, by comparing the signals to one another or to a known golden sample.

Unfortunately, these testing procedures may be time consuming and/or costly. Moreover, although the test vectors may allow testing of the integrated circuit during production, it may not provide a solution for continued testing of the integrated circuit. For example, when the integrated circuit is used in a mobile radiotelephone, problems may arise with the integrated circuit baseband I/Q modulator after manufacturing, that may remain undetected in the field. In particular, the integrated circuit baseband I/Q modulator may be subject to input data and/or programmed with DC offsets that are outside the linear operating range of a Digital-to-Analog Converter (DAC) that is contained within the baseband I/Q modulator. This may provide erroneous modulated data, even though the modulator appears to be working properly. Accordingly, these problems may be difficult to detect and resolve after manufacture and integration into a wireless communications terminal.

SUMMARY OF THE INVENTION

The present invention can provide integrated circuit transmit modules that include an integrated circuit substrate, a baseband I/Q modulator in the integrated circuit substrate that modulates an input signal to produce in-phase (I) and quadrature (Q) baseband modulated inputs, and a Built-In Self-Test (BIST) module in the integrated circuit substrate that monitors the I and Q baseband modulated outputs, to determine whether the baseband I/Q modulator is operating properly. By providing a BIST module in the integrated circuit substrate, operations of the baseband I/Q modulator can be monitored during manufacture and during subsequent field use. Autonomous testing of a baseband I/Q modulator thereby may be provided. In-circuit verification of output samples and feedback may be provided regarding the integrity of the output signal, for example to determine if the in-phase and quadrature baseband modulated outputs are corrupted due to excessive DC offsets and/or out-of-range digital signal processor samples.

According to embodiments of the present invention, a BIST module also generates test input data for the baseband I/Q modulator, such that the BIST module monitors the I and Q baseband modulated outputs in response to the test input data, to determine whether the baseband I/Q modulator is operating properly. According to other embodiments, the BIST module monitors the I and Q baseband modulated outputs in response to a communications input signal from a Digital Signal Processor (DSP), to determine whether the baseband I/Q modulator is operating properly.

Other embodiments of the present invention include a DSP interface module in the integrated circuit substrate that provides DSP data to the baseband I/Q modulator to be modulated. The BIST module provides the test input to the DSP interface module, such that the DSP interface module provides the test input data to the baseband I/Q modulator. Other embodiments also include a Central Processing Unit (CPU) or controller interface module in the integrated circuit substrate. The BIST module can generate a status signal to indicate whether the baseband I/Q modulator is operating properly. The status signal can comprise an analog and/or digital status signal and/or a multibit/multiword digital data communication. The CPU interface module is responsive to the status signal and can provide the status signal to a CPU.

According to other embodiments of the invention, a BIST module includes a first filter that is responsive to the input signal to produce a filtered input signal and a second filter that is responsive to the I and Q baseband modulated outputs, to produce a filtered output signal. A compare module compares the filtered input signal and the filtered output signal to determine whether the baseband I/Q modulator is operating properly. In other embodiments, the first and second filters are Finite Impulse Response (FIR) and/or Infinite Impulse Response (IIR) filters. The second filter models an analog filter that filters the I and Q baseband modulated outputs prior to providing these outputs to an RF modulator.

According to yet other embodiments, a BIST module further includes a phase and amplitude adjuster that is responsive to the first filter, to adjust the phase and amplitude of the filtered input signal, such that the compare module compares the filtered input signal having adjusted phase and amplitude, and the filtered output signal, to determine whether the baseband I/Q modulator is operating properly. According to still other embodiments, a compare module compares the filtered input signal and the filtered output signal, to determine whether a difference between the filtered input signal and the filtered output signal exceeds a tolerance value. The tolerance value may be fixed. Alternatively, in other embodiments, the CPU and/or other device provides the tolerance value to the compare module, for example via the CPU interface module.

Methods of testing integrated circuit baseband IQ modulators in an integrated circuit substrate according to embodiments of the invention monitor the I and Q baseband modulated outputs in the integrated circuit substrate and generate in the integrated circuit substrate an indicator of whether the baseband modulator is operating properly in response to the I and Q baseband modulated outputs that are monitored in the integrated circuit substrate. As was described above, test input data may be generated in the integrated circuit substrate for the baseband I/Q modulator. Alternatively, a communications input signal for the baseband I/Q modulator may be received in the integrated circuit substrate from a DSP and the I and Q baseband modulated outputs may be monitored in the integrated circuit substrate in response to the communications input signal to determine whether the baseband I/Q modulator is operating properly. FIR/IIR filtering, comparing and/or phase and/or amplitude adjusting may be provided, as was described above. A fixed or variable tolerance value may be used, as was described above. The indicator may comprise an analog and/or digital indicator and/or a multibit/multiword digital data indicator.

It will be understood by those having skill in the art that BIST systems and methods according to the invention may be used for integrated circuit baseband modulators and integrated circuit modulators other than baseband quadrature modulators. The BIST systems and/or methods may be integrated into a wireless communications terminal. Improved monitoring of modulator performance thereby may be provided, during and/or after production of the integrated circuit modulator, during and/or after manufacture of the wireless communications terminal that includes the modulator and/or during field operation of the wireless communications terminal.

BRIEF DESCRIPTION OF THE DRAWINGS

FIG. 5 is a flowchart illustrating operations for testing a modulator according to the present invention.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
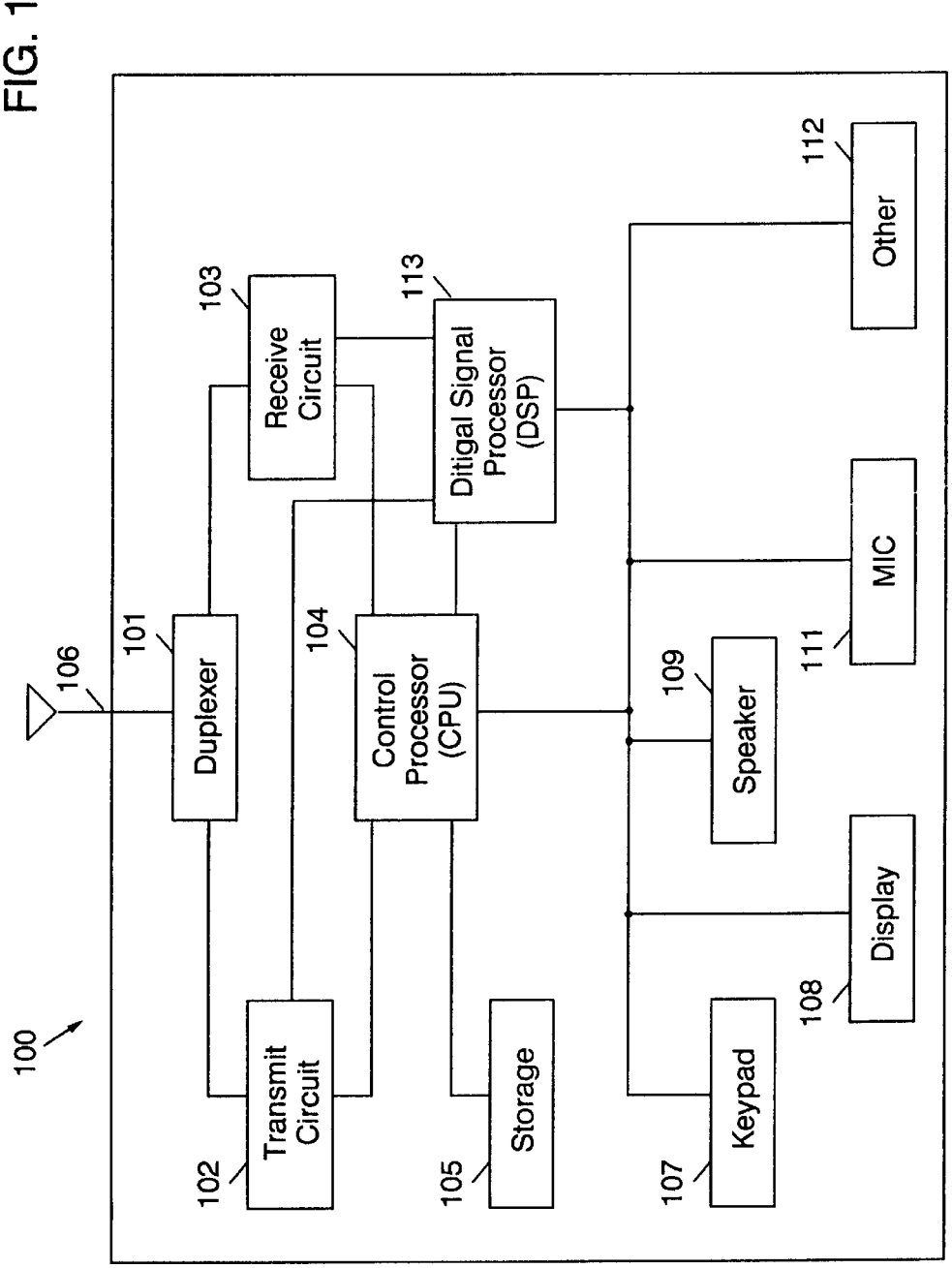
FIG. 1 is a simplified block diagram of embodiments of wireless communications terminals according to the present invention.

Referring now to FIG. 1, a simplified block diagram of embodiments of wireless communications terminals according to the present invention, is shown. As shown in FIG. 1, wireless-communications terminals 100 can be embodied as a cellular telephone, a satellite telephone and/or a high function terminal that provides functions in addition to those of the cellular telephone, such as facsimile, data communications, data processing, word processing and/or other personal communications systems functions. These high function terminals often are referred to as Personal Communications Systems (PCS). Multiple mode wireless communication terminals that employ two or more of these functions also may be provided. Moreover, wireless communications terminals 100 may be embodied as desktop and/or laptop computers that include wireless modems and also may be embodied as wireless digital appliances.

As shown in FIG. 1, the embodiments of wireless communications terminals 100 include a duplexer 101 that couples a transmit circuit 102 and a receive circuit 103 to an antenna 106. A control processor (Central Processing Unit-CPU) 104 is coupled to the transmit circuit 102 and/or the receive circuit 103, to control the operations thereof. Storage (memory) 105 is coupled to the control processor 104, to provide a storage capacity for program and data information. A Digital Signal Processor (DSP) 113 also is included that is coupled to the transmit circuit 102, the receive circuit 103 and/or the control processor 104, to process digital communications signals. It will be understood by those having skill in the art that the functions of the control processor 104 and the digital signal processor 113 may be combined into a single processor. Various portions of the transmit circuit 102, the receive circuit 103 and/or the duplexer 101 may be combined as well.

As further shown in FIG. 1, the wireless communications terminals 100 also generally include a user interface including a keypad 107, a display 108, a speaker 109 and/or a microphone 111. In order to provide a wireless communications terminal for receiving transmissions of audio, video, data and/or multimedia signals, the keypad 107 may be a full scale personal computer keyboard, and the display 108 may be a graphics display. Other devices 112, such as disk drives, scanners and/or modems may be provided, to provide a wireless communications terminal.

The present invention adds built-in self-test (BIST) circuits and methods to the transmit circuit 102. Apart from the transmit circuit 102 including BIST circuits and methods, the remaining portions of FIG. 1 are well known to those having skill in the art and need not be described in further detail herein.

Figure 2:
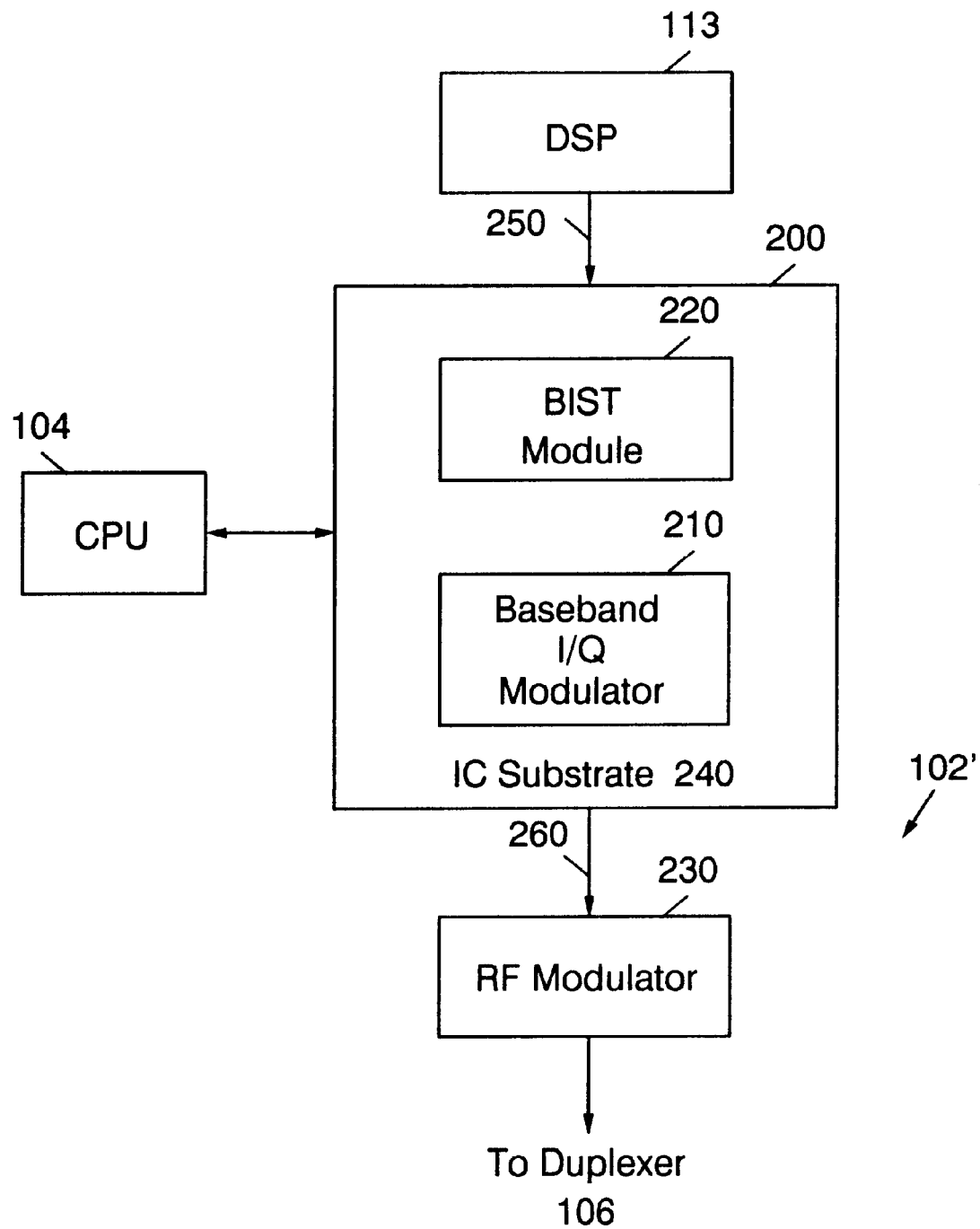
FIG. 2 is a block diagram of embodiments of transmit circuits including embodiments of integrated circuit transmit modules according to the present invention.

Referring now to FIG. 2, embodiments of transmit circuits including embodiments of integrated circuit transmit modules according to the present invention now will be described. As shown in FIG. 2, a transmit circuit, for example the transmit circuit 102 of FIG. 1, includes an integrated circuit transmit module 200 and an RF modulator 230. In FIG. 2, the integrated circuit transmit module 200 and the RF modulator 230 are shown as separate blocks. However, they may be integrated into a single integrated circuit substrate as well.

Continuing with the description of FIG. 2, embodiments of integrated circuit transmit modules 200 include an integrated circuit substrate 240 which may be a conventional microelectronic substrate, such as a silicon semiconductor substrate. A baseband I/Q modulator 210 is provided in the integrated circuit substrate 240 that modulates an input signal, for example an input signal 250 that is provided from the DSP 113, to produce in-phase (I) and quadrature (Q) baseband modulated outputs 260 that may be provided, for example, to the RF modulator 230. A BIST module 220 also is included in the integrated circuit substrate 240, which monitors the I and Q baseband modulated outputs 260, to determine whether the baseband I/Q modulator 210 is operating properly.

It will be understood that the integrated circuit transmit module 200 may be provided in the form of an Application Specific Integrated Circuit (ASIC) and/or other conventional integrated circuit combinations of logic, processor and/or memory functions. Moreover, the integrated circuit transmit module 200 and all or part of the RF modulator 230 may be integrated into a common integrated circuit substrate. Further integration also may be provided by also integrating all or part of the CPU 104, the DSP 113 and/or other components into a common integrated circuit substrate.

Figure 3:
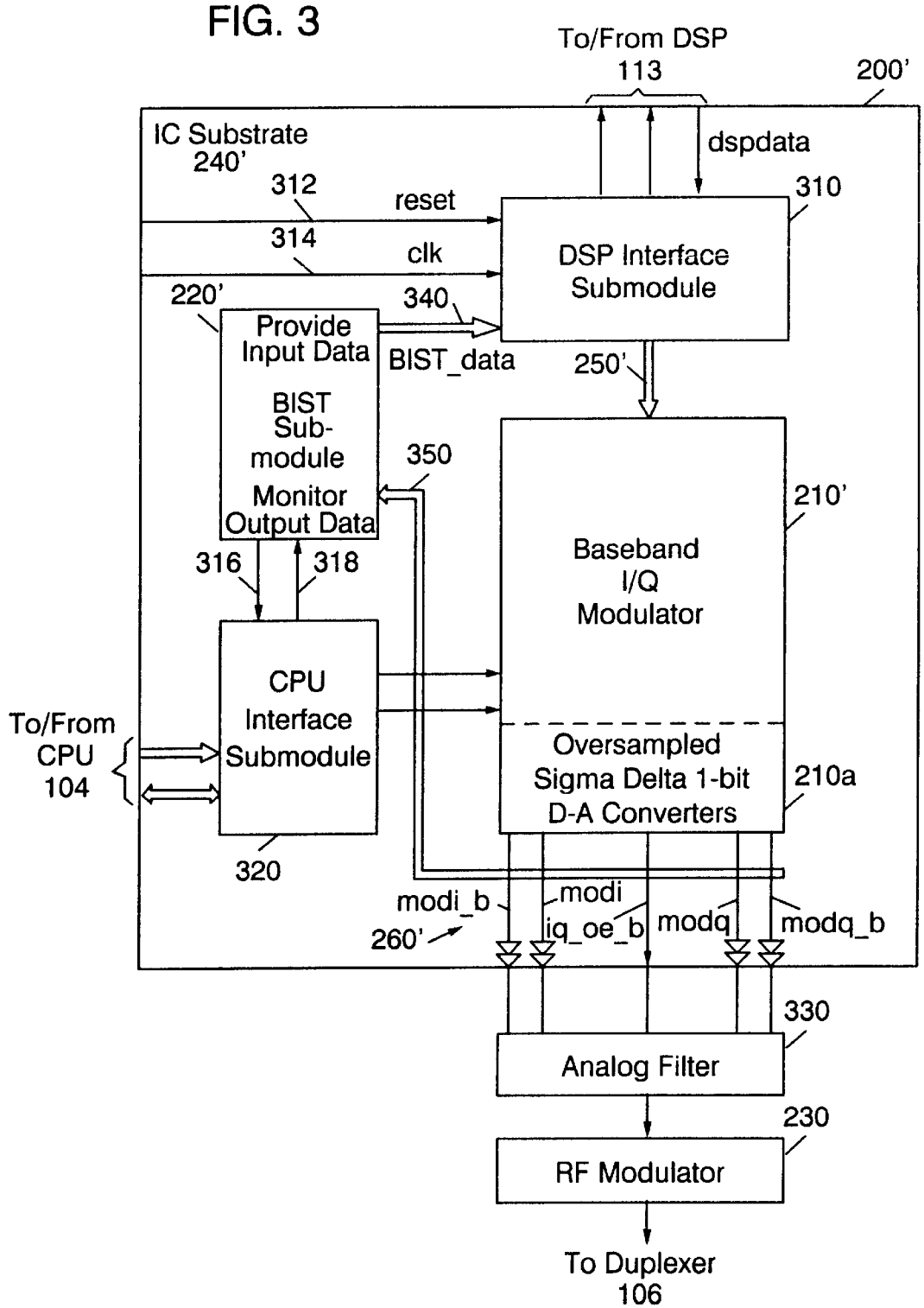
FIG. 3 is a block diagram of other embodiments of integrated circuit transmit modules according to the present invention.

FIG. 3 is a block diagram of other embodiments of integrated circuit transmit modules 200' according to the present invention. As shown, an integrated circuit substrate 240' includes a baseband I/Q modulator 210' that modules an input signal, for example an input signal 250' that may be provided from a DSP interface submodule 310, to produce in-phase and quadrature baseband modulated outputs 260'. The in-phase true and complement signals are labeled modi and modi_b, respectively, in FIG. 3, and the quadrature true and complement modulated outputs are labeled modq and modq_b, respectively, in FIG. 3. An output enable signal also is provided, labeled iq_oe_b in FIG. 3, that can enable and disable the outputs of the baseband I/Q modulator 210' during built-in self-test, so that the built-in self-test signals are not transmitted by the wireless communications terminal. As shown in FIG. 3, the baseband I/Q modulator 210' includes oversampled sigma delta 1-bit digital-to-analog (D-A) converters 210a that can provide the I and Q modulated outputs 260' in analog form. However, other techniques and components may be used in the baseband I/Q modulator 210'.

Continuing with the description of FIG. 3, it can be seen that a BIST module, referred to in FIG. 3 as a BIST submodule 220', monitors the I and Q baseband modulated outputs 260' via a bus or other internal circuitry 350, to determine whether the baseband I/Q modulator 210' is operating properly. As is also shown in FIG. 3, the BIST submodule 220' also generates test input data, also referred to as BIST_data 340, for the baseband I/Q modulator 210'. The BIST submodule 220' monitors the I and Q baseband modulated outputs via bus 350 in response to the test input data 340 to determine whether the baseband I/Q modulator is operating properly. The test input data 340 may be provided to a DSP interface submodule 310, which accepts DSP data from the DSP 113 and provides a control interface with the DSP 113 as well. The DSP submodule 310 also may obtain other control signals, such as a reset signal 312 and/or a clock signal 314 from the CPU 104 and/or from other modules in the wireless communications terminal. As used herein, the terms "module" and "submodule" are used interchangeably, to indicate a portion of an integrated circuit substrate 240 or 240'.

As shown in FIG. 3, the BIST submodule 220' may operate in at least two modes. In a first operational mode, the BIST submodule 220' generates test input data, such as BIST_data 340, for the baseband I/Q modulator 210' such that the BIST submodule monitors the I and Q baseband modulated outputs 260', for example using bus 350, in response to the test input data 340 to determine whether the baseband I/Q modulator is operating properly. Alternatively, in a second operational mode, the BIST submodule 220' monitors the I and Q baseband modulated outputs 260', for example via bus 350, in response to a communications input signal from the DSP 113 to determine whether the baseband I/Q modulator is operating properly. The DSP interface submodule 310 may be used to provide DSP data to the baseband I/Q modulator 210' and/or to provide the test input data 340 to the baseband I/Q modulator 210' from the BIST submodule 220', such that the DSP interface submodule 310 provides the test input data 340 to the baseband I/Q modulator 210'. Alternatively, the communications input signal from the DSP 113 and/or the test input data 340 from the BIST submodule 220' may be provided directly to the baseband I/Q modulator 210', bypassing the DSP interface submodule 310.

As is also shown in FIG. 3, the BIST submodule 220' can interface with a CPU interface submodule 320. For example, the BIST submodule 220' may provide a status signal or indication 316 to the CPU interface module 320 to indicate whether the baseband I/Q modulator is operating properly. Moreover, as will be described in detail below, the BIST submodule 220' may determine whether the baseband I/Q modulator 210' is operating within a tolerance value. This tolerance value may be preset. Alternatively, the CPU 104 may provide the tolerance value 318 to the BIST submodule 220' via the CPU interface submodule. The BIST submodule 220' also can interface directly with the CPU 104, bypassing the CPU interface submodule 320. Alternatively, the integrated circuit transmit module 200' need not include a DSP interface submodule 310 and/or a CPU interface submodule 320. Rather, these submodules may be provided outside the integrated circuit substrate 240' or may be incorporated within the respective DSP 113 and/or CPU 104.

The in-phase and quadrature baseband modulated outputs 260' are provided to an RF modulator 230 for radio frequency modulation. An analog filter 330 also may be provided between the baseband I/Q modulator 210' and the RF modulator 230 to filter the in-phase and quadrature baseband modulated outputs 260', for example to reduce high frequency components thereof. The analog filter 330 may be incorporated in the RF modulator 230. Moreover, the analog filter 330, the RF modulator 230 and/or portions thereof may be incorporated into the integrated circuit substrate 240'.

Figure 4:
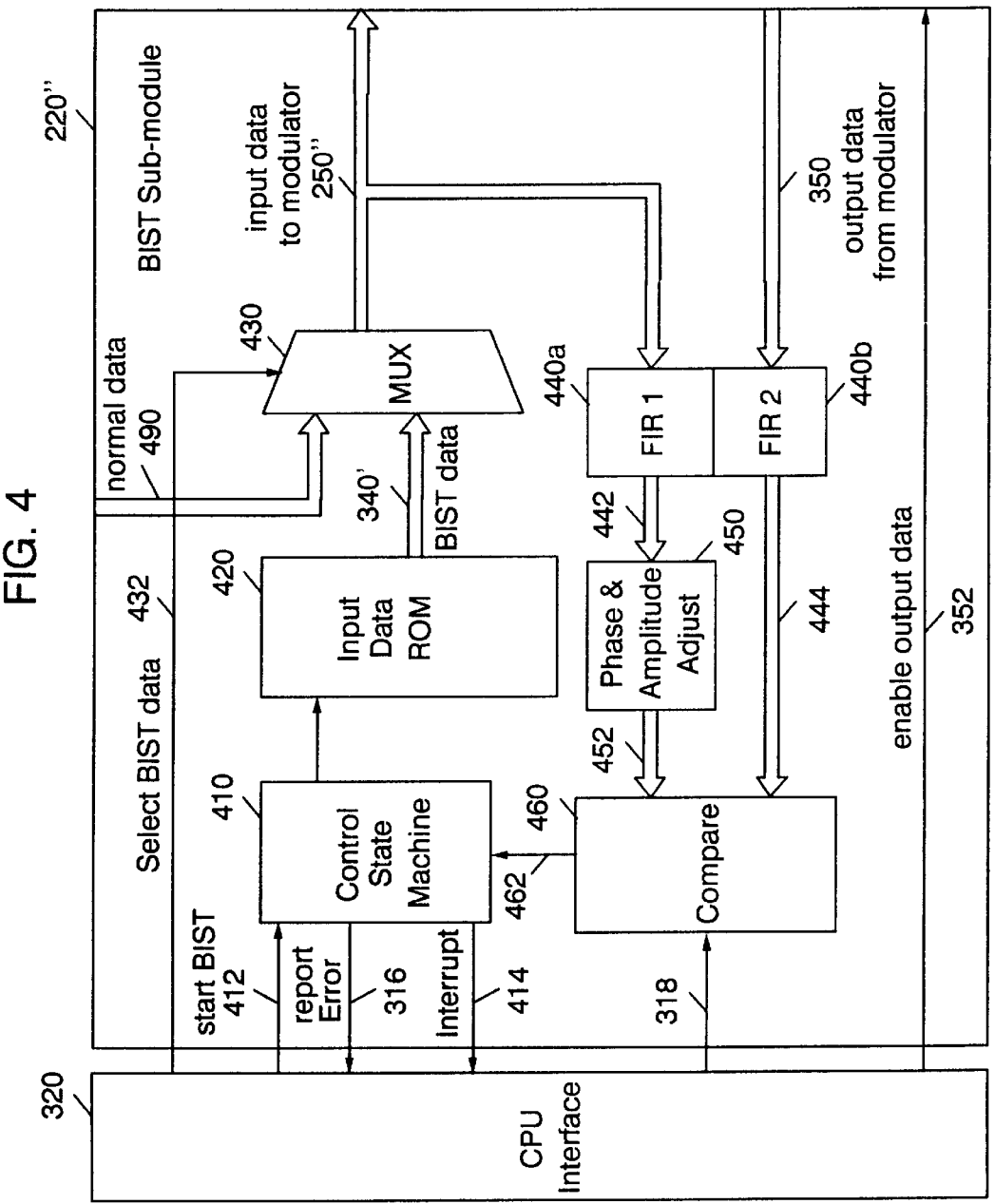
FIG. 4 is a block diagram of other embodiments of built-in self-test (BIST) modules according to the present invention.

FIG. 4 is a block diagram of other embodiments of BIST submodules 220". As shown, these embodiments of BIST submodules 220" include a control state machine 410 or other microcontroller that is responsive to a start BIST signal 412 from the CPU 104, for example, via the CPU interface 320, and that can provide an interrupt signal 414 to the CPU 104, for example, via the CPU interface 320. A status signal or indication 316 to report an error also may be provided. The control state machine 410 may be embodied in hardware, a special purpose processor, software running on a general purpose processor and/or combinations thereof. An input data Read Only Memory (ROM) 420 and/or other conventional storage device can store the BIST data 340' and can provide the BIST data 340' under control of the control state machine 310. The BIST data 340' is provided to a multiplexer (MUX) 430 that also can accept normal data (also referred to as a communications input signal) 490, for example from the DSP 113 via the DSP interface submodule 310. A select BIST data signal 432 may select either the BIST input data 340 or the communications input signal 490, for example under control of the CPU 104 via the CPU interface 320. Alternatively, the select BIST data signal 432 may be provided by the control state machine 410.

Still referring to FIG. 4, the input data 250" is provided to the baseband I/Q modulator 210/210'. The input data 250" is also provided to a first filter 440a that is responsive to the input signal 250", to produce a filtered input signal 442. The I and Q baseband modulated outputs 260' also may be provided, for example via bus 350, to a second filter 440b, to produce a filtered output signal 444. The first and second filters 440a and 440b preferably are Finite Impulse Response (FIR) filters. The first FIR filter 440*a* may obtain, for example, 8-bit data samples of input data 250' and can smooth the response of the I and Q transitions over time. An 8-bit filtered input signal 442 thereby may be produced. The second FIR filter 440*b* preferably obtains the 1-bit high rate I and Q baseband modulated outputs via the bus 350 and preferably models the analog filter 330 that filters the I and Q baseband modulated outputs and/or the filter response of the modulator, to produce a filtered output signal 444. The filtered output signal 444 may be, for example 15 bits wide. It also will be understood that the FIR filters 440*a* and 440*b* may be implemented using analog and/or digital components, and may be included in a digital signal processor. Moreover, a single common digital filter with programmable taps may be provided and time shared to provide filters 440*a* and 440*b*. Other filters such as Infinite Impulse Response (IIR) filters also may be used.

Still referring to FIG. 4, a phase and amplitude adjuster 450 also may be provided that is responsive to the first filter 440*a*, to adjust the phase and amplitude of the filtered input signal 442, to thereby produce a filtered input signal having adjusted phase and/or amplitude 452. Phase and/or amplitude adjustments preferably are performed in order to time and/or amplitude align the input data 250" and the output data 350 that will be compared by a data compare circuit 460. The phase and/or amplitude alignment parameters may be constant and/or may be programmable. Thus, for example, the output 444 of the second filter 440*b* may be 15-bit wide data and the output 452 of the phase and amplitude adjuster 450 may be 15-bit wide data that is time and phase aligned to the output 444 of the second digital filter 440*b*.

The compare module 460 compares the filtered and phase/amplitude adjusted input signal 452 and the filtered output signal 444 to determine whether the baseband I/Q modulator is operating properly. More particularly, the compare module 460 preferably compares the filtered input signal 452 and the filtered output signal 444, to determine whether a difference between the filtered input signal 452 and the filtered output signal 444 exceeds a tolerance value. The tolerance value may be fixed. Alternatively, the tolerance value 318 may be obtained from the CPU 104 for example via the CPU interface 320. The data compare module 460 may produce a status signal 462 that can then be relayed to the CPU 104 for example via the CPU interface 320 as signal 316.

Referring now to FIG. 5, operations for testing a baseband I/Q modulator according to the present invention now will be described. As shown at Block 502, operations begin when the CPU 104 or other device and/or module indicates that the BIST is to begin, for example, by providing a Run BIST signal 412 via the CPU interface 320. This can activate the control state machine 410 at Block 504. A test is made, for example, by monitoring the state of the Select BIST data signal 432, to indicate whether the BIST test input data 340 or communications input signal 490 is to be used for the test at Block 506. If BIST test input data is used, then BIST data 340 is provided, for example, from the input data ROM 420, to the multiplexer 430 at Block 508. If not, then normal data input 490 is provided to the multiplexer 430 at Block 512. The data from the multiplexer 430 is provided as input data 250" to the baseband I/Q modulator 210/210'. The I/Q modulated outputs 260/260' are then monitored at Block 514 and filtered, for example through a digital filter 440*b*, at Block 516, to model the analog signal represented from the modulator.

The input data to the modulator 250' also is filtered, for example, through the first digital filter 440*a* at Block 518, and optionally phase and/or amplitude adjusted, for example, by the phase and amplitude adjuster 450 at Block 522, to compensate for the delay and/or signal amplitude changes of the baseband I/Q modulator 210'.

Referring now to Block 524, a test is made, for example, in the compare module 460, as to whether the filtered input signal 452 and the filtered output signal 444 are within a tolerance. The tolerance may be contained in a software-accessible register. A default value may be set to a given value, such as ±1%, but the CPU can make this range larger or smaller before an error is reported.

If the filtered input signal 452 and the filtered output signal 444 are not within the tolerance, then an error is reported at Block 526, for example by sending the error signal 462 to the control state machine 410. If they are within tolerance, then operations continue if the Run BIST signal still is enabled at Block 502, thereby providing continuous BIST testing. Alternatively, the Run BIST signal may be disabled by the CPU at Block 502 to terminate BIST testing. The error or failure status may be provided to the CPU 104, for example, via the CPU interface 320, using an interrupt 414 and/or a status signal 316. Alternatively, a status bit could be sent in a register accessible to the CPU 104.

The present invention can be used to verify that the DC offset levels that are programmed for the baseband I/Q modulator 210/210' are not causing the output signals 260/260' to clip, or causing the digital-to-analog converters 210*a* to operate in their nonlinear regions. Selection of the BIST data 432 may be provided by the CPU 104 or other device external to the integrated circuit transmit module, to select between BIST data 340 and external data 490. BIST data may be used during production and/or at various times during field operation. Moreover, external data also may be used prior to field operation and/or during field operation. However, preferably, the BIST data 340 is used prior to field operation after the integrated circuit transmit module 200 is manufactured and/or after the integrated circuit transmit module 200 is integrated into a wireless communications terminal. Also preferably, in-circuit verification using a communications input signal 490 preferably is performed after the wireless communications terminal is operational, for field testing.

Accordingly, a baseband I/Q modulator 210/210' can be continually tested and/or fine tuned for optimal settings. Normal communications signals 490 can be used for self-testing. This can provide an ability to diagnose problems that may be occurring in the baseband modulator, for example due to excessive DC offset. Testing may be performed as field testing, to thereby allow the circuit settings in the baseband I/Q modulator to be improved and preferably optimized for real-world environments. Moreover, in-circuit testing may be used to fine tune the circuit in the factory, for example to initialize the wireless communications terminal without the need for extra test time. This may be accomplished by running the in-circuit test at the same time another part of the device is undergoing a different factory test.

Thus, an integrated circuit transmit module 200 can be placed in an in-circuit test mode, for example using the Run BIST signal 412, and the settings, for example for DC offset, can be changed while the results are monitored by the BIST submodule 220 in the integrated circuit. These circuits then can be adjusted and preferably optimized, for example by software in the CPU 104 and/or in the BIST submodule 220, based on the results of the in-circuit testing.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. An integrated circuit transmit module comprising:

an integrated circuit substrate;

a baseband I/Q modulator in the integrated circuit substrate that modulates an input signal to produce in-phase (I) and quadrature (Q) baseband modulated outputs;

a built-in-self-test (BIST) module in the integrated circuit substrate that monitors the I and Q baseband modulated outputs to determine whether the baseband I/Q modulator is operating properly; and wherein the BIST module is configured to monitor the I and Q baseband modulated outputs in response to a communication input signal from a digital signal processor (DSP) to determine whether the baseband I/Q modulator is operating properly.

2. An integrated circuit transmit module according to claim 1 in combination with a radio frequency modulator that is configured to modulate the I and Q baseband modulated outputs onto a radio frequency carrier, and at least one user interface device, to provide a wireless communication terminal.

3. An integrated circuit transmit module comprising:

an integrated circuit substrate;

a baseband I/Q modulator in the integrated circuit substrate that modulates an input signal to produce in-phase (I) and quadrature (Q) baseband modulated outputs;

a built-in-self-test (BIST) module in the integrated circuit substrate that monitors the I and Q baseband modulated outputs to determine whether the baseband I/Q modulator is operating properly; and a digital signal processor (DSP) interface module in the integrated circuit substrate that provides DSP data to the baseband I/Q modulator to be modulated, and wherein the BIST module is configured to provide the test input data to the DSP interface module, such that the DSP interface module provides the test input data to the baseband I/Q modulator.

4. An integrated circuit transmit module comprising:

an integrated circuit substrate;

a baseband I/Q modulator in the integrated circuit substrate that modulates an input signal to produce in-phase (I) and quadrature (Q) baseband modulated outputs;

a built-in-self-test (BIST) module in the integrated circuit substrate that monitors the I and Q baseband modulated outputs to determine whether the baseband I/Q modulator is operating properly; and wherein the BIST module is configured to generate a status signal to indicate whether the baseband U/Q modulator is operating properly.

5. An integrated circuit transmit module according to claim 4 further comprising a central processing unit (CPU) interface module in the integrated circuit substrate, that is responsive to the status signal and that is configured to provide the status signal to a CPU.

6. An integrated circuit transmit module comprising:

an integrated circuit substrate;

a baseband I/Q modulator in the integrated circuit substrate that modulates an input signal to produce in-phase (I) and quadrature (Q) baseband modulated outputs;

a built-in-self-test (BIST) module in the integrated circuit substrate that monitors the I and Q baseband modulated outputs to determine whether the baseband I/Q modulator is operating properly;

wherein the first filter is a first finite or infinite impulse response (FIR/IIR) filter;

wherein the second filter is a second FIR/IIR filter that models an analog filter that filters the I and Q baseband modulated outputs; and wherein the BIST module further comprises
   a first filter that is responsive to the input signal to produce a filtered input signal,
   a second filter that is responsive to the I and Q baseband modulated outputs to produce a filtered output signal,
   a compare module that compares the filtered input signal and the filtered output signal to determine whether the baseband I/Q modulator is operating properly, and
   a phase and amplitude adjuster that is responsive to the first filter and is configured to adjust the phase and amplitude of the filtered input signal such that the compare module compares the filtered input signal having adjusted phase and amplitude and the filtered output signal to determine whether the baseband I/Q modulator is operating properly.

7. An integrated circuit transmit module according to claim 6 further comprising a programmable tap FIR/IIR filter, wherein the first and second filters are embodied by programming the taps of the programmable tap FIR/IIR filter.

8. An integrated circuit transmit module comprising:

an integrated circuit substrate;

a baseband I/Q modulator in the integrated circuit substrate that modulates an input signal to produce in-phase (I) and quadrature (Q) baseband modulated outputs;

a built-in-self-test (BIST) module in the integrated circuit substrate that monitors the I and Q baseband modulated outputs to determine whether the baseband I/Q modulator is operating properly, wherein the BIST module comprises:
   a first filter that is responsive to the input signal to produce a filtered input signal;
   a second filter that is responsive to the I and Q baseband modulated outputs to produce a filtered output signal; and
   a compare module that compares the filtered input signal and the filtered output signal to determine whether the baseband I/Q modulator is operating properly; and wherein the compare module is configured to compare the filtered input signal and the filtered output signal to determine whether a difference between the filtered input signal and the filtered output signal exceeds a tolerance value.

9. An integrated circuit transmit module according to claim 8 further comprising a central processing unit (CPU) interface module in the integrated circuit substrate, wherein the compare module is responsive to the CPU interface module to obtain the tolerance value from a CPU.

10. An integrated circuit transmit module comprising:
   an integrated circuit substrate;
   a baseband I/Q modulator in the integrated circuit substrate that modulates an input signal to produce in-phase (I) and quadrature (Q) baseband modulated outputs;
   a built-in-self-test (BIST) module in the integrated circuit substrate that monitors the I and Q baseband modulated outputs to determine whether the baseband I/Q modulator is operating properly;
   a digital signal processor (DSP) interface module in the integrated circuit substrate; and
   a central processing unit (CPU) interface module in the integrated circuit substrate.

11. A method of testing an integrated circuit baseband I/Q modulator in an integrated circuit substrate that modulates an input signal to produce in-phase (I) and quadrature (Q) baseband modulated outputs, the method of testing comprising the steps of:
   monitoring the I and Q baseband modulated outputs in the integrated circuit substrate;
   generating in the integrated circuit substrate, an indication of whether the baseband I/Q modulator is operating properly, in response to the I and Q baseband modulated outputs that are monitored in the integrated circuit substrate;
   wherein the monitoring step comprises the steps of
      filtering the input signal to produce a filtered input signal,
      filtering the I and Q baseband modulated outputs to produce a filtered output signal, and
      comparing the filtered input signal and the filtered output signal to determine whether the baseband I/Q modulator is operating properly;
   wherein the following step is performed between the steps of filtering the input signal and comparing,
   adjusting phase and amplitude of the filtered input signal, and wherein the comparing step comprises the step of comparing the filtered input signal having adjusted phase and amplitude and the filtered output signal to determine whether the baseband I/Q modulator is operating properly.

12. A method according to claim 11 further comprising the steps of:
   receiving a communication input signal for the baseband I/Q modulator in the integrated circuit substrate from a digital signal processor (DSP); and
   wherein the monitoring step comprises the step of monitoring the I and Q baseband modulated outputs in the integrated circuit substrate in response to the communication input signal to determine whether the baseband I/Q modulator is operating properly.

13. A method according to claim 11:
   wherein the step of filtering the input signal comprises the step of applying the first input signal to a first finite or infinite impulse response (FIR/IIR) filter; and
   wherein the step of filtering the I and Q baseband modulated outputs comprises the step of applying the I and Q baseband modulated outputs to a second FIR/IIR filter that models an analog filter that filters the I and Q baseband modulated outputs.

14. A method according to claim 11 wherein the steps of filtering the input signal and filtering the I and Q baseband modulated outputs comprise the steps of varying taps of a programmable tap FIR/IIR filter.

15. A method of testing an integrated circuit baseband I/Q modulator in an integrated circuit substrate that modulates an input signal to produce in-phase (I) and quadrature (Q) baseband modulated outputs, the method of testing comprising the steps of:
   monitoring the I and Q baseband modulated outputs in the integrated circuit substrate;
   generating in the integrated circuit substrate, an indication of whether the baseband I/Q modulator is operating properly, in response to the I and Q baseband modulated outputs that are monitored in the integrated circuit substrate;
   wherein the monitoring step comprises the steps of:
      filtering the input signal to produce a filtered input signal;
      filtering the I and Q baseband modulated outputs to produce a filtered output signal; and
      comparing the filtered input signal and the filtered output signal to determine whether the baseband I/Q modulator is operating properly;
      wherein the comparing step comprises the step of comparing the filtered input signal and the filtered output signal to determine whether a difference between the filtered input signal and the filtered output signal exceeds a tolerance value.

16. A method according to claim 15 wherein the comparing step is preceded by the step of obtaining the tolerance value from a central processing unit (CPU).

17. An integrated circuit transmit module comprising:
   an integrated circuit substrate;
   a modulator in the integrated circuit substrate that modulates an input signal to produce modulated outputs;
   a built-in-self-test (BIST) module in the integrated circuit substrate that monitors the modulated outputs to determine whether the modulator is operating properly; and
   wherein the BIST module is configured to monitor the modulated outputs in response to a communication input signal from a digital signal processor (DSP) to determine whether the modulator is operating properly.

18. An integrated circuit transmit module comprising:
   an integrated circuit substrate;
   a modulator in the integrated circuit substrate that modulates an input signal to produce modulated outputs;
   a built-in-self-test (BIST) module in the integrated circuit substrate that monitors the modulated outputs to determine whether the modulator is operating properly; and
   a digital signal processor (DSP) interface module in the integrated circuit substrate that provides DSP data to the modulator to be modulated, and wherein the BIST module provides the test input data to the DSP interface module, such that the DSP interface module provides the test input data to the modulator.

19. An integrated circuit transmit module comprising:
   an integrated circuit substrate;
   a modulator in the integrated circuit substrate that modulates an input signal to produce modulated outputs;
   a built-in-self-test (BIST) module in the integrated circuit substrate that monitors the modulated outputs to determine whether the modulator is operating properly; and
   wherein the BIST module is configured to generate a status signal to indicate whether the modulator is operating properly.

20. An integrated circuit transmit module according to claim 19, further comprising a central processing unit (CPU) interface module in the integrated circuit substrate, that is responsive to the status signal and that is configured to provide the status signal to a CPU.

21. An integrated circuit transmit module comprising:

an integrated circuit substrate;

a modulator in the integrated circuit substrate that modulates an input signal to produce modulated outputs;

a built-in-self-test (BIST) module in the integrated circuit substrate that monitors the modulated outputs to determine whether the modulator is operating properly;

wherein the BIST module comprises a first filter that is responsive to the input signal to produce a filtered input signal, wherein the first filter is a first finite or infinite impulse response (FIR/IIR) filter, a second filter that is responsive to the modulated outputs to produce a filtered output signal, wherein the second filter is a second FIR/IIR filter that models an analog filter that filters the modulated outputs, a compare module that compares the filtered input signal and the filtered output signal to determine whether the modulator is operating properly, and a phase and amplitude adjuster that is responsive to the first filter and is configured to adjust the phase and amplitude of the filtered input signal such that the compare module compares the filtered input signal having adjusted phase and amplitude and the filtered output signal to determine whether the modulator is operating properly.

22. An integrated circuit transmit module comprising:

an integrated circuit substrate;

a modulator in the integrated circuit substrate that modulates an input signal to produce modulated outputs;

a built-in-self-test (BIST) module in the integrated circuit substrate that monitors the modulated outputs to determine whether the modulator is operating properly;

wherein the BIST module comprises a first filter that is responsive to the input signal to produce a filtered input signal, a second filter that is responsive to the modulated outputs to produce a filtered output signal, a compare module that compares the filtered input signal and the filtered output signal to determine whether the modulator is operating properly, and wherein the compare module is configured to compare the filtered input signal and the filtered output signal to determine whether a difference between the filtered input signal and the filtered output signal exceeds a tolerance value.

23. An integrated circuit transmit module according to claim 22 further comprising a central processing unit (CPU) interface module in the integrated circuit substrate, wherein the compare module is responsive to the CPU interface module to obtain the tolerance value from a CPU.

24. An integrated circuit transmit module according to claim 22 in combination with a radio frequency modulator that is configured to modulate the modulated outputs onto a radio frequency carrier, and at least one user interface device, to provide a wireless communications terminal.

25. An integrated circuit transmit module comprising:

an integrated circuit substrate;

a modulator in the integrated circuit substrate that modulates an input signal to produce modulated outputs;

a built-in-self-test (BIST) module in the integrated circuit substrate that monitors the modulated outputs to determine whether the modulator is operating properly;

a digital signal processor (DSP) interface module in the integrated circuit substrate; and a central processing unit (CPU) interface module in the integrated circuit substrate.

* * * * *